US012231480B1

(12) United States Patent
Wade et al.

(10) Patent No.: US 12,231,480 B1
(45) Date of Patent: *Feb. 18, 2025

(54) NETWORK SEGMENTATION FOR MULTI-DWELLING UNIT (MDU)

(71) Applicants: DISH Network L.L.C., Englewood, CO (US); DISH Network Technologies India Private Limited, Karnataka (IN)

(72) Inventors: Joshua D. Wade, Castle Rock, CO (US); Jason Anthony Madruga, Castle Rock, CO (US); Clark Hurst Pendery, Englewood, CO (US); Dalton William Hertel, Denver, CO (US); Aaron William Schwartz, Denver, CO (US); Ryan Scribner, Erie, CO (US); Himanshu Jain, Karnataka (IN); Sandeep Kumar Bhatta, Karnataka (IN); Laxminarayana Dalimba, Bengaluru (IN)

(73) Assignees: DISH Network L.L.C., Englewood, CO (US); DISH Network Technologies India Private Limited, Bengaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,598

(22) Filed: Apr. 17, 2024

Related U.S. Application Data

(63) Continuation of application No. 18/357,834, filed on Jul. 24, 2023, now Pat. No. 11,991,230.

(51) Int. Cl.
*H04L 65/611* (2022.01)
*H04L 9/40* (2022.01)
*H04L 65/752* (2022.01)

(52) U.S. Cl.
CPC ........ *H04L 65/611* (2022.05); *H04L 63/0876* (2013.01); *H04L 65/752* (2022.05)

(58) Field of Classification Search
None
See application file for complete search history.

(56) References Cited

U.S. PATENT DOCUMENTS 8,156,246 B2 * 4/2012 Short .................. H04L 63/0892
709/239
11,126,939 B2 * 9/2021 Mappus ......... G06Q 10/063116
(Continued)

FOREIGN PATENT DOCUMENTS

WO 2013/142967 A1 10/2013

*Primary Examiner* — Quang N Nguyen
(74) *Attorney, Agent, or Firm* — Kilpatrick Townsend & Stockton LLP

(57) ABSTRACT

Methods and systems for provisioning content streaming service are provided. An example method includes dividing a network associated with a multi-dwelling unit (MDU) having multiple zones within the MDU into multiple network segments respectively corresponding to the multiple zones, dividing a content resource provided by the MDU into multiple segments respectively corresponding to the multiple network segments. Each segment of the content resource includes content items specific to the corresponding network segment based on a predetermined network policy. The method further includes receiving a request from a user equipment (UE) for access to a content item of the content resource, determining that the UE is associated with one of the network segments and that the requested content item is included in the segment of content resource specific to the network segment, and granting the access to the content item to the UE.

18 Claims, 11 Drawing Sheets

(56) References Cited

U.S. PATENT DOCUMENTS

| | | |
|---|---|---|
| 11,991,230 B1 | 5/2024 | Wade et al. |
| 2008/0097858 A1 | 4/2008 | Vucina et al. |
| 2011/0293277 A1 | 12/2011 | Bradea et al. |
| 2014/0068692 A1 | 3/2014 | Archibong et al. |
| 2014/0089182 A1* | 3/2014 | Short ............ H04L 61/25 705/40 |
| 2014/0244648 A1 | 8/2014 | Wyatt et al. |
| 2014/0244778 A1 | 8/2014 | Wyatt et al. |
| 2017/0094356 A1 | 3/2017 | Mathews et al. |
| 2017/0272196 A1 | 9/2017 | Davidson, Jr. et al. |
| 2019/0268633 A1 | 8/2019 | Jayawardene et al. |
| 2019/0268762 A1* | 8/2019 | Bestermann ........ H04W 12/02 |
| 2019/0303562 A1 | 10/2019 | Masputra et al. |
| 2020/0236414 A1 | 7/2020 | Rhoads et al. |
| 2022/0417310 A1 | 12/2022 | Thaw et al. |
| 2023/0144753 A1 | 5/2023 | Jayawardene et al. |

* cited by examiner

NETWORK SEGMENTATION FOR MULTI-DWELLING UNIT (MDU)

This application is a continuation of U.S. Non-Provisional patent application Ser. No. 18/357,834, filed on Jul. 24, 2023, which is incorporated by reference for all purposes.

BACKGROUND OF THE DISCLOSURE

A multi-dwelling unit (MDU) such as a hotel often provides content streaming services through a network for the tenants or users within the MDU. Streaming media content requires a significant amount of bandwidth, and if the network is not designed to handle the load, users within the MDU may experience low media quality or poor viewing experience. In addition, multiple users accessing the network simultaneously can cause congestion, resulting in slower connection speeds and poor performance. Moreover, users in the same MDU may have different preferences for the type of content they want to stream, and if the network does not offer a variety of options, it may negatively impact their experience. Thus, there is a need for improving content streaming service and user viewing experience in an MDU environment.

BRIEF SUMMARY OF THE DISCLOSURE

In accordance with some embodiments of the present disclosure, a method is provided. In one example, a method includes: receiving a user request for streaming a content item from a user equipment (UE) connected to a first network segment corresponding to a first zone of a multi-dwelling unit (MDU), the user request including a first network identifier assigned to the first network segment and a user identity associated with the user, identifying the first network segment based on the first network identifier assigned to the first network segment, determining accessibility of the content item to the user, based on a pre-established network policy specifying content resources designated to the first network segment, in response to a determination that the content item is included in the content resources designated to the first network segment, performing an authentication process to authenticate the user based on the user identity associated with the user, and transmitting the requested content item to the UE via a routed network traffic over the first network segment to allow the UE to stream the requested content. The method may be implemented by a computer device or system.

In accordance with some embodiments of the present disclosure, a system for provisioning content streaming service for an MDU is provided. In one example, the system includes: one or more processors and a computer-readable storage media storing computer-executable instructions. The computer-executable instructions, when executed by the one or more processors, cause the system to: receive a user request for streaming a content item from a user equipment (UE) connected to a first network segment corresponding to a first zone of a multi-dwelling unit (MDU), the user request including a first network identifier assigned to the first network segment and a user identity associated with the user, identify the first network segment based on the first network identifier assigned to the first network segment, determine accessibility of the content item to the user, based on a pre-established network policy specifying content resources designated to the first network segment, in response to a determination that the content item is included in the content resources designated to the first network segment, perform an authentication process to authenticate the user based on the user identity associated with the user, and transmit the requested content item to the UE via a routed network traffic over the first network segment to allow the UE to stream the requested content.

In accordance with some embodiments, the present disclosure also provides a non-transitory machine-readable storage medium encoded with instructions, the instructions executable to cause one or more electronic processors of a system to: receive a user request for streaming a content item from a user equipment (UE) connected to a first network segment corresponding to a first zone of a multi-dwelling unit (MDU), the user request including a first network identifier assigned to the first network segment and a user identity associated with the user, identify the first network segment based on the first network identifier assigned to the first network segment, determine accessibility of the content item to the user, based on a pre-established network policy specifying content resources designated to the first network segment, in response to a determination that the content item is included in the content resources designated to the first network segment, perform an authentication process to authenticate the user based on the user identity associated with the user, and transmit the requested content item to the UE via a routed network traffic over the first network segment to allow the UE to stream the requested content.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE DISCLOSURE

The present disclosure provides devices, systems, and methods for provisioning content streaming services to users of an MDU. One insight provided in the present disclosure is related to zone segmentation of an MDU and provide differentiates content streaming services for users in different MDU segments (also referred to as zones) of an MDU. In one example, an MDU is divided into multiple zones. Each zone has a defined geographic boundary and includes one or more unit of the MDU or a common area of the MDU. A network segmentation is performed to partition the network of the MDU into multiple network segments (e.g., subnets or virtual local area network (VLAN)) according to the zones of the MDU. For example, each network segment corresponds to a specific zone of the MDU. A network policy is established to specify the streaming services and content resources designated to each network segment of the MDU. The network policy may be established based on a variety of factors such as the function and utility of the zone, user levels, common characteristics of the users, etc. In this way, the content streaming service can be segmented based on differentiated user experiences, such that a user in a specific zone of the MDU can be connected to the corresponding network segment and access the content streaming service designated to that network segment. Accordingly, the overall efficiency of service provisioning and network performance of the MDU may be improved.

Another insight provided by the present disclosure is related to group recording for the different zone in an MDU. In one example, an MDU gateway device may be used to predict a target content item and a target recording item, perform group recording of the target content item to generate a single copy of shared recording, and provision the content of the shared recording to multiple users within the MDU. The network policy may specify the shared recordings designated to each network segment, and the shared recording is provisioned to authorized users in a zone and connected to the corresponding network segment, according to the network policy. In this way, the service of shared recordings can be differentiated based on zone/network segmentation, such that a user in a specific zone of the MDU and connected to the corresponding network segment can access the shared recording designated to that network segment. In addition, the group recording could effectively reduce the redundant copies of the same recorded content for each user in a specific zone of the MDU, reduce the usage of the overall storage space, and improve the overall efficiency of recording management for the MDU.

Figure 1:
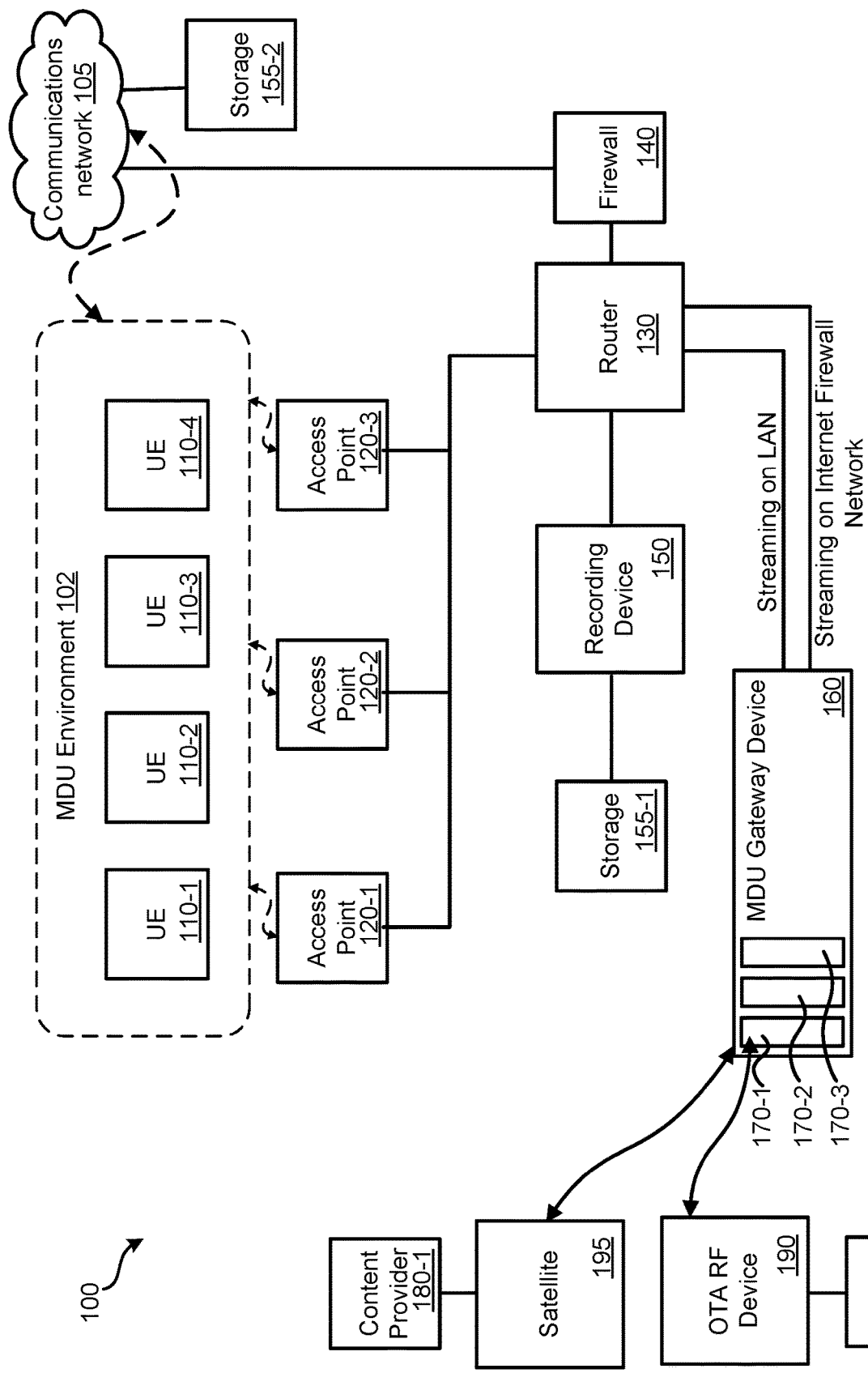
FIG. 1 is a schematic diagram illustrating an example of a communications system according to various embodiments.

FIG. 1 is a schematic diagram illustrating an example of a communications system 100 (also referred to as "system 100") according to various embodiments. In the illustrated example, the system 100 includes, among other components, multiple UEs 110 in an MDU environment 102 (also referred to as "MDU 102"), a communications network, multiple access points 120, a MDU gateway device 160, a recording device 150, a storage device 155, a router (or a layer 3 network device or the like) 130, and a firewall 140.

The MDU 102 used here in refer to a residential building or complex that contains multiple compartments or separate living units within a single structure. Examples of MDUs include apartment buildings consisting of multiple individual apartments within a single building, condominiums in which individual units are owned by their occupants but the common areas and facilities are shared, townhouses or similar buildings with multi-story units, co-operative housing that operates under a different ownership and governance model in which the residents collectively manage the property, duplexes and triplexes, hotels, motels, dormitories, downtown lofts, a senior living center, a college or university campus, an apartment complex.

Multiple UEs 110 (e.g., 110-1, 110-2, 110-3, 110-4, etc.) are located within the MDU environment 102. The UEs may be owned, operated, controlled by various users across the multiple units of the MDU 102. A household or a user of each unit of the MDU 102 may have one or more UEs. The users in within the same MDU 102 may not share their UEs. However, UEs within one single unit of the MDU 102 may be interconnected through a local network (not illustrated) such as a wireless network or a wired network. The UE 110 is generally used to any devices that are used by the user to access the communications network 105 to receive, stream, play, and present media content from any content sources internal within the MDU 102 and external to the MDU 102 (e.g., from a content provider). Examples of UE 110 include televisions (TV) and smart TVs, set top boxes, satellite set top box, gaming consoles, smartphones, tables, wearables, streaming sticks, smart projectors, virtual reality and augmented reality (VR/AR) devices, integrated receiver decoders, and so on. In a hotel MDU, the UEs may be a fixed UE permanently installed in a unit or an area of the MDU 102 or a mobile UE carried along with a user. The UEs 110 may communicate with the MDU gateway device 160 and/or access the communications network 105 through one or more access points 120 (e.g., 120-1, 120-2, 120-3, etc.).

The access points 120 are generally network devices that extend the network coverage within the MDU 102, enable the UEs 110 to connect to the MDU gateway device 160, and enable the UEs 110 to access the communications network 105. In some embodiments, an access point (e.g., 120-1) may be installed within one unit of the MDU 102 and exclusively used by UEs within the unit. Alternatively, an access point may be installed in a common area of the MDU 102 and shared by UEs across various units of the MDU 102.

The MDU gateway device 160 functions as a central hub for the communication of UEs 110 of the individual units within the MDU 102. In some embodiments, the MDU gateway device 160 is installed in the MDU 102 by the MDU administrator (e.g., a property manager). Among other capabilities, the MDU gateway device 160 is configured to receive content from content providers, record the content to generate a shared copy of the content, and delivery the shared copy of content to a UE 110 within the MDU 102 upon request.

The MDU gateway device 160 may be in communication with content providers 180 (i.e., 180-1, 180-2, etc.) through data transmission devices, such as over-the-air (OTA) radio frequency (RF) device 190 or satellite 195. Satellite 195 may be used to transmit content to the MDU gateway device 160 over television and radio broadcasting, as well as for internet access in remote areas where traditional wired connections are not available. On the other hand, the OTA RF device 190 may be used to transmit content to the MDU gateway device 160 over a wireless network, such as Wi-Fi or cellular networks. In some embodiments, the content provider is a commercial streaming service provider such as SLINGTV® or DISH DBS®. Other content delivery and recording systems are also within the scope of the present disclosure.

Alternatively, in other embodiments, the MDU gateway device 160 may be in connection with a head end (not shown) separate from the MDU gateway device. The head end (e.g., a branded smart box of a content provider, or a smart box designed and provided by a third party) is in communication with the content providers 180 and is configured to receive content from the content providers 180 and further transmit the content to the MDU gateway device

160. In other words, the MDU gateway device 160 may receive content from the content provider 180 via the separate head end.

The MDU gateway device 160 may include one or more origin server 170 (e.g., 170-1, 170-2, 170-3, etc.) configured to stream the content received from the content providers 180. The origin server 170 includes a hardware component used to enable high-quality streaming or content over either a local area network (LAN) or a wide area network (WAN). The origin server may include a specialized processing unit designed to handle streaming traffic with low latency and high throughput. The origin server 170 can be used to support various types of streaming protocols and codecs, including popular protocols such as HTTP Live Streaming (HLS), Real Time Messaging Protocol (RTMP), Multicast IP based Streaming, and Dynamic Adaptive Streaming over HTTP (DASH). The origin server 170 can also support different quality levels and resolutions to accommodate different network conditions and device capabilities.

The router 130 is configured to facilitate communications between the UEs 110 and the MDU gateway device 160, the recording device 150, and the storage device 155 within the MDU 102. The router 130 can be connected to the MDU gateway device 160 either through a wired or wireless connection. Once connected, the router 130 can assign unique IP addresses to each UE 110 or access points 120 within the network, allowing them to communicate with each other and with devices outside the network. The content received by the MDU gateway device 160 may be distributed to the UEs 110 and other devices within the MDU 102 (e.g., the recording device 150) via the router 130 through LAN streaming.

The firewall 140 (also referred to as "network firewall 140") connected to the communications network 105 is configured to monitor and control incoming and outgoing network traffic to prevent unauthorized access or attacks from outside the MDU 102. In some embodiments, the firewall is integrated to or installed on the MDU gateway device 160 that connects the internal network of the MDU 102 to the communications network 105. The firewall 140 may be in a form of a physical hardware device, a software-based firewall running on the MDU gateway device 160, or a combination thereof. In some embodiments, the firewall 140 may also provide additional features such as Quality of Service (QOS) control, which can prioritize network traffic for certain applications to ensure smooth and consistent performance for content streaming and sharing. In some embodiments, the content received by the MDU gateway device 160 is distributed to the UEs 110 and other devices within the MDU 102 (e.g., the recording device 150) via the firewall 140 through WAN streaming.

The recording device 150 is connected to the MDU gateway device 160 via the router 130. The recording device 150 is configured to record the content received by the MDU gateway device 160 and generate a copy of the content. The copy of the content may be stored in a storage device 155. The storage device 155 may be a local device (e.g., 155-1) within the MDU 102 or a cloud storage device (e.g., 155-2) connected to the communications network 105. The copy of the content stored in the storage device 155 is accessible by the UEs 110 via the router 130 (e.g., through LAN streaming) or via the communications network 105 through network streaming. Examples of the recording device 150 include but are not limited to Digital Video Recorder (DVR), Network Video Recorder (NVR), Video On Demand (VOD) server, media server, cloud-based recording service.

In some embodiments, the recording device 150 is a smart edge server located within the MDU 102 and close to the UEs 110. The smart edge server is configured to record contents and stored the recorded contents locally at the edge (i.e., the MDU 102) of the network. Smart edge servers can be used to reduce latency and improve performance for applications that require real-time or near-real-time data processing within the MDU 102.

In some embodiments, the MDU gateway device 160 is in connection with a head end (not shown) separate from the MDU gateway device 160 and is configured to receive content from the content provider 180 via the head end. The recording device 150 may be included in the MDU gateway device 160 or configured as an internal device/function of the MDU gateway device 160.

Figure 2:
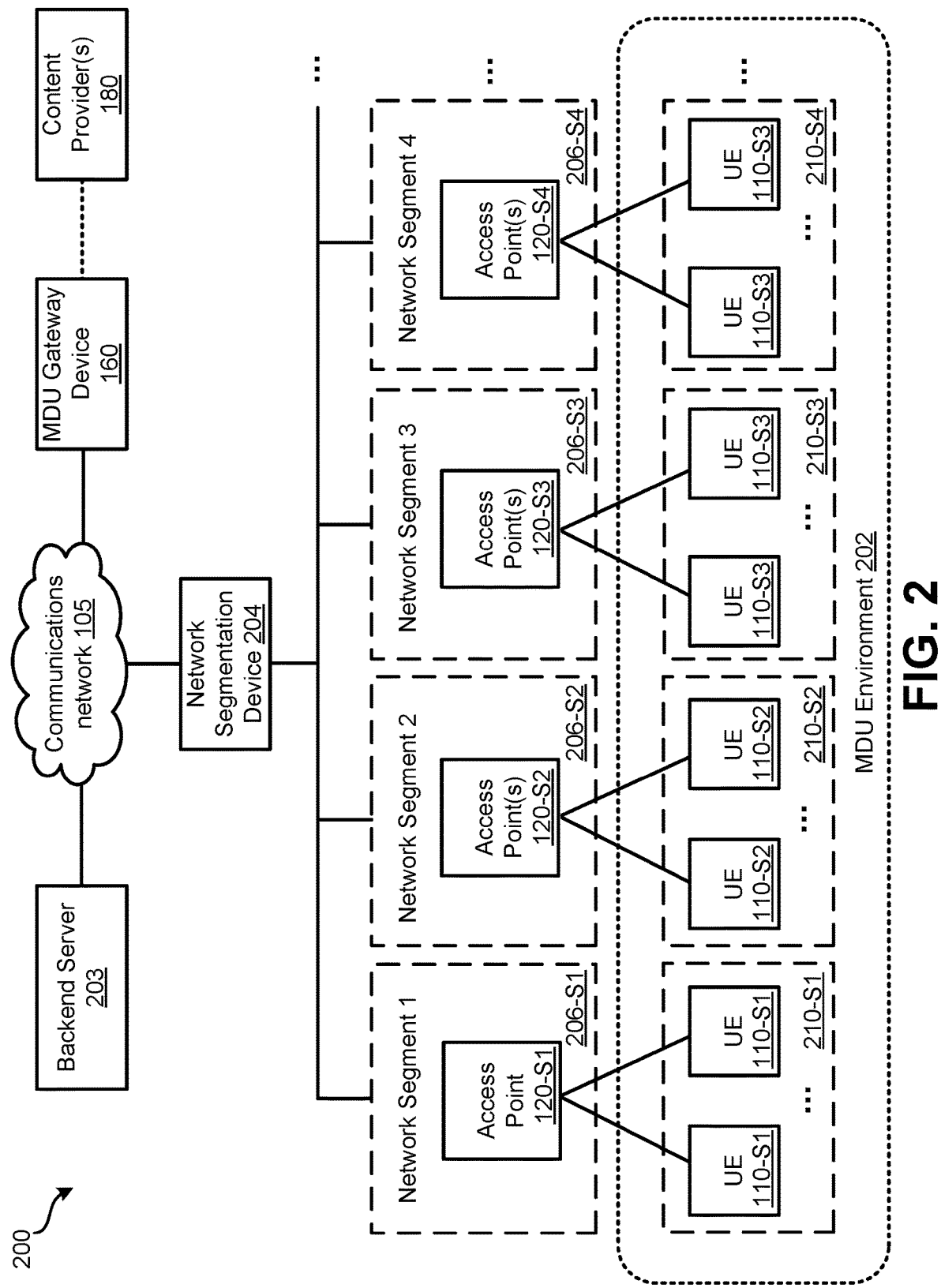
FIG. 2 illustrates a schematic diagram illustrating another example of a communications system according to various embodiments.

FIG. 2 is a schematic diagram illustrating another example of a communications system 200 (also referred to as "system 200") according to various embodiments. The system 200 is a variation of the system 100 and may include one or more component of the system 100. In the illustrated example, the system 200 includes, among other components, an MDU environment 202, a backend server 203, a communications network 105, a MDU gateway device 160, one or more content providers 180, and a network segmentation device 204. The system 200 may include additional components and/or network functions.

The MDU environment 202 is divided into multiple zones 210 (e.g., a first zone 210-S1, a second zone 210-S2, a third zone 210-S3, a fourth zone 210-S4, etc.). In some embodiments, the MDU environment 202 may be divided geographically, and each zone 210 has a defined geographic boundary. Each zone 210 may include one or more units of the MDU, a common area, or a unit of a particular function. For example, when the MDU environment 202 represents a building, the zones 210 may represent different floors or areas within the building. When the MDU environment 202 represents a hotel, the zones 210 may represent different rooms or categories of rooms, such as standard guest rooms, premium guest rooms, lobby, lounge, swimming pool, dining area, gym, conference rooms, and so on.

The network segmentation device 204 is in connection with the communications network 105 and is configured to partition or divide the communication network 105 into multiple network segments 206 (e.g., a first network segment 206-S1, a second network segment 206-S2, a third network segment 206-S3, a fourth network segment 206-S4, etc.) respectively corresponding to the multiple zones 210 of the MDU environment 202. Each network segment 206 may have one or more access points 120 (e.g., a first access point 120-S1, a second access point 120-S2, a third access point 120-S3, a fourth access point 120-S4, etc.). The access points 120 are provided for the UEs 110 within each zone 210 to get access to the communications network 105. For example, UEs 110-S1 in the zone 210-S1 can access the network segment 1 (206-S1) via the access point 120-S1. Likewise, UEs 110-S2 in the zone 210-S2 can access the network segment 2 (206-S2) via the access point 120-S2; UEs 110-S3 in the zone 210-S3 can access the network segment 3 (206-S3) via the access point 120-S3, and so forth.

In some embodiments, the network segmentation device 204 is a router. The router may be configured and operable to perform the network segmentation by respectively routing the network traffics from the communications network 105 to the access point 120 of each network segment 206.

Examples of the router and methods of network segmentation will be described below in details with references to FIGS. 4 and 5A-5B.

The backend server 203 is in connection with the communications network 105 and may be operated by the content provider 180, a streaming service provider that provides content streaming service to the MDU 202, or a third party. The backend server 203 is configured to establish a network segmentation policy (also referred to as network policy or service segmentation policy) and store the network policy. According to the network policy, different streaming and content provisioning services are correspondingly designated to different network segments 206. For example, an MDU administrator (e.g., a MDU property or premises manager) may work with the Internet Service provider (ISP) to set up policies and restrictions based on the network segments 206. Certain network segments may be designated with a specific type of streaming or content provisioning service, while others may have access to a wider range of streaming service or content provisioning service. For example, each network segment may be designated with a specific list of channels for the users connected to the network segment to access. Each network segment may be designated with a specific level of Quality of Service (QoS) such as streaming bitrate and quality, a specific layout of user interface (e.g., user interface template), or specific user features (e.g., Pause on Live TV support, Time-Shifted Viewing, Playback Control, etc.). Deep packet inspection (DPI) technology may be used to analyze the content of network traffic and determine which network segments should have access to specific types of streaming content. Additionally, content filtering or blocking at the network segment level may be used to restrict access to certain types of content based on the type and function of the zones 210 according to the established network policy. Other factors such as the user experience level and user status (e.g., paid service or unpaid service, standard membership or premium membership, etc.) may also be considered in service segmentation. The network policy may be stored in a database in connection with the backend server 203.

As one example, the MDU environment 202 represents a hotel building, which is divided into multiple zones 210. Each zone 210 may represent a category of rooms or areas depending on the size, amenities, location, view, occupancy capacity, function, etc. For example, The first zone 210-S1 may cover the lobby area, the second zone 210-S2 may cover the swimming pool and gym, the third zone 210-S3 may cover standard guest rooms, the fourth zone 210-S4 may cover premium guest rooms, and so forth. Each zone 210 is designated with specific streaming and content provisioning services through the corresponding network segment 206, according to the pre-established network policy as mentioned above. For example, the first zone 210-S1 may be designated with limited streaming services; the second zone 210-S2 may be designated with certain sport channels on the corresponding network segment 206-S2, and access to sport channels may not be provided to users not connected to the network segment 206-S2. The users connected to the fourth zone 210-S4 (covering premium guest rooms) may have broader access to streaming and content services compared with users connected to the third zone 210-S3 (covering standard guest rooms). In this arrangement, streaming service and content resources can be segmented and allocated among different network segments 206. Thus, user viewing experiences can be differentiated based on the network segmentation, and the overall network efficiency and performance may be improved.

Figure 3:
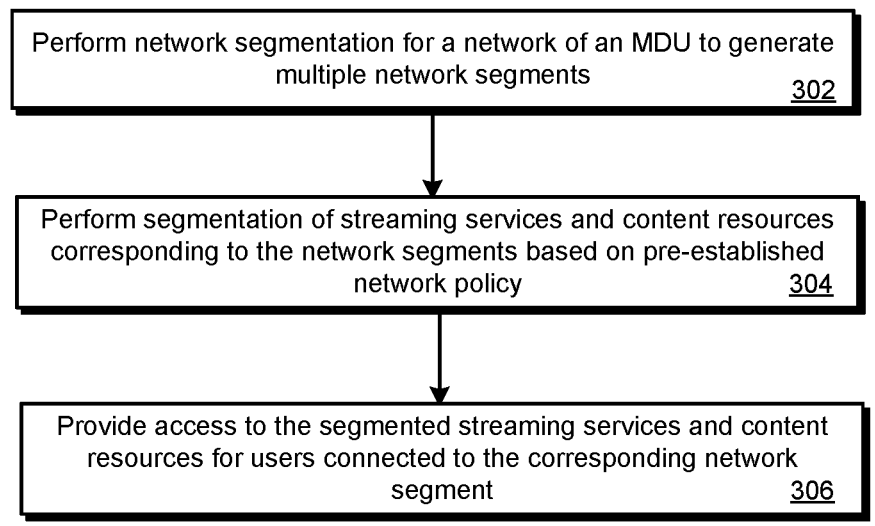
FIG. 3 is a flow diagram illustrating an example method for provisioning content streaming service to a user of an MDU according to various embodiments.

FIG. 3 is a flow diagram illustrating an example method 300 for provisioning content streaming service to users of an MDU, according to various embodiments. The method 300 may be performed by a device or system. The method 300 may be performed by one or more components of the system or device illustrated by FIGS. 1-2, such as one or more components of the systems 100 or 200. Depending on the implementation, the method 300 may include additional, fewer, or alternative steps performed in various orders or in parallel.

At 302, network segmentation for a communications network of an MDU is performed to generate multiple network segments for users of the MDU. Examples of network segmentation are described below in details with references to FIGS. 4 and 5A-5B.

At 304, segmentation of streaming services and content resources is performed. Streaming services and content resources are divided into and designated among the multiple network segments based on the pre-established network policy. As mentioned above, the network policy may be established by the MDU administrator and/or the content provider on a backend server. The network policy for streaming services and content resources for each network segment in an MDU would typically include rules and regulations regarding which types of content can be accessed by users connected to each network segment. The network policy would define the specific streaming services or content resources that are allowed or blocked on each network segment based on factors such as user level, network usage, and security requirements. For example, in a hotel MDU, the network policy for a premium guest room segment may allow access to a wider range of streaming services compared to the network policy for a standard guest room segment. The premium room segment policy may allow access to premium streaming services, while the standard guest room segment policy may only allow access to basic streaming services. The network policy may also include rules for bandwidth allocation, data usage limits, and time restrictions on streaming services to ensure optimal network performance for all users connected to each network segment. Additionally, the network policy may also outline consequences for users who violate the content streaming policy.

At 306, access to the segmented streaming and content provisioning services is provided for users connected to the corresponding network segment. Examples of provisioning streaming and content services in details are described below with references to FIGS. 5A-5B and 7A-7B.

Figure 4:
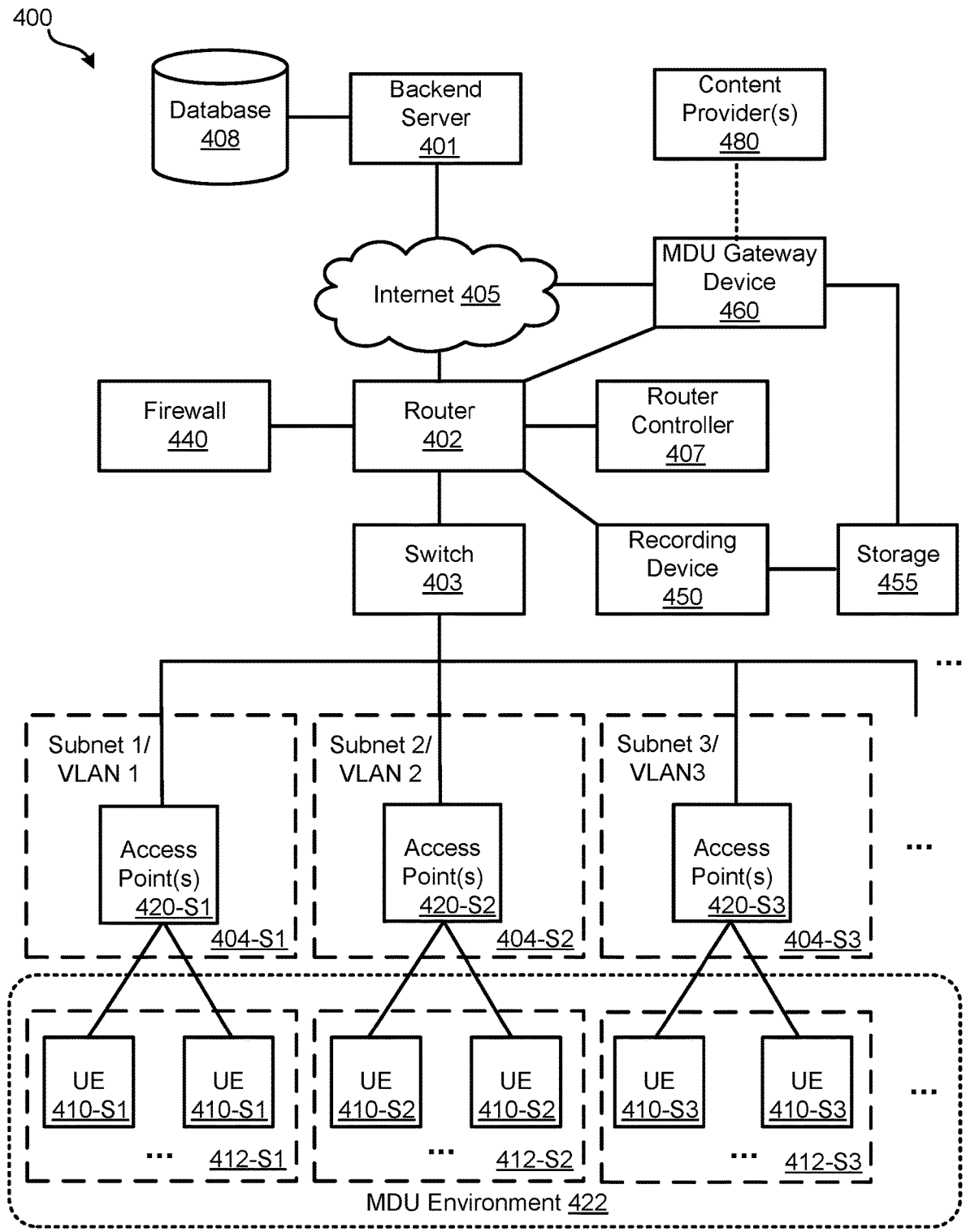
FIG. 4 illustrates a schematic diagram illustrating another example of a communications system according to various embodiments.

FIG. 4 is a schematic diagram illustrating another example of a communications system 400 (also referred to as "system 400") according to various embodiments. The system 400 is a close variation of the systems 100 and 200 and may include one or more component of the systems 100 and 200. In the illustrated example, the system 400 includes, among other components, an MDU environment 422 (also referred to as MDU 422), Internet 405, a MDU gateway device 460, one or more content providers 480, a backend server 401, a router 402, a switch 403, a router controller 407, access points 420, a recording device 450, a firewall 440, one or more storage devices 455, and a database 408.

The MDU environment 422 includes multiple zones 412, (e.g., zone 412-S1, zone 412-S2, zone 412-S3, etc.). Contents from the content provider 480 may be transferred over Internet 405 to the end user (e.g., UEs 410) and other components of the system 400. The UEs 410 is in connection with the internet 405 via access points 420. The router 402 is configured to route internet traffic (e.g., data communication that carries contents and streams) to various network segments. The switch 403 connected to the router 402 serves as a distribution point for the internet traffic coming from various devices. The switch 403 is configured to receive data packets from the MDU gateway device 460 and the UEs 410 and send the data packets to their intended destination. The switch 403 is also configured to learn the MAC addresses of the various devices connected thereto and store them in MAC address table. This helps the switch 403 to forward the data packets to the correct destination without flooding the network. The switch 403 can also be configured to prioritize certain types of internet traffic or to block certain types of traffic based on the pre-established network policy.

The router controller 407 may be a software or hardware or a combination of software and hardware that manages and controls the router 402 in the system 400. The router controller 407 provides a centralized interface for managing the MDU network, configuring the router 402, monitoring network traffic, and troubleshooting issues. The router controller 407 may include a user interface, which may be accessed through a web browser or dedicated software application, to allow the MDU administrator to perform tasks such as creating and managing network policies, configuring network settings, and viewing network statistics and logs.

In the illustrated example, Internet 405 for the MDU 422 is divided into multiple network segments 404 (e.g., network segment 404-S1, network segment 404-S2, network segment 404-S3, etc.) respectively corresponding to the multiple zones 412 (e.g., zone 412-S1, zone 412-S2, zone 412-S3, etc.) of the MDU. The network segments 404 may be in a form of a subnet (i.e., wide area network (WAN) or local area network (LAN)) or a virtual LAN (VLAN). Segmentation of Internet 405 may be performed using a subnetting approach (shown in FIG. 5A) or a VLAN approach (shown in FIG. 5B). As mentioned above, different streaming services and content resources may be designated to each of the network segments 404, so that the users connected to a particular network segment 404 can get access to the particular streaming services or content resources designated to that network segment.

Upon receipt of a data packet of the content from the content provider, the router 402 is operable to determine which network segment the data packet is transferred to, according to the pre-established network policy. For example, if the content is designated to network segment 1 404-S1, the data packet is then routed to the access points 420-S1, and UEs 410-S1 in the zone 412-S1 can receive the data packet via the access point 420-S1 and stream the content on the UE 410-S1.

The backend server 401 is configured to provide a centralized platform for network management and user services, including management of user accounts, access rights, user authentication, UE eligibility determination, etc. The backend server 401 may also be used to monitor network activity, provide security services, manage network resources such as bandwidth and IP addresses. The database 408 connected to the backend server 401 is configured to store the MDU profile, user profiles, network policies, and other information regarding streaming service and content resource provisioning.

The recording device 450 is similar to the recording device 150 shown in FIG. 1 and is configured to record the content received by the MDU gateway device 460 and generate a copy of the content (i.e., a recording). The recording may be stored in the storage device 455 for sharing among the users of the MDU 422. As described below, the network policy may specify the shared recordings designated to each network segment. A UE of an authorized user may be connected to a network segment 404 and get access to the shared recording upon request. In some embodiments, one or more storage devices 455 may be used to store the shared recordings separately. Each zone 412 of the MDU 422 may be designated with a storage device 455 that stores the shared recordings designated to the network segment 404 corresponding to the zone 412.

Figure 5A:
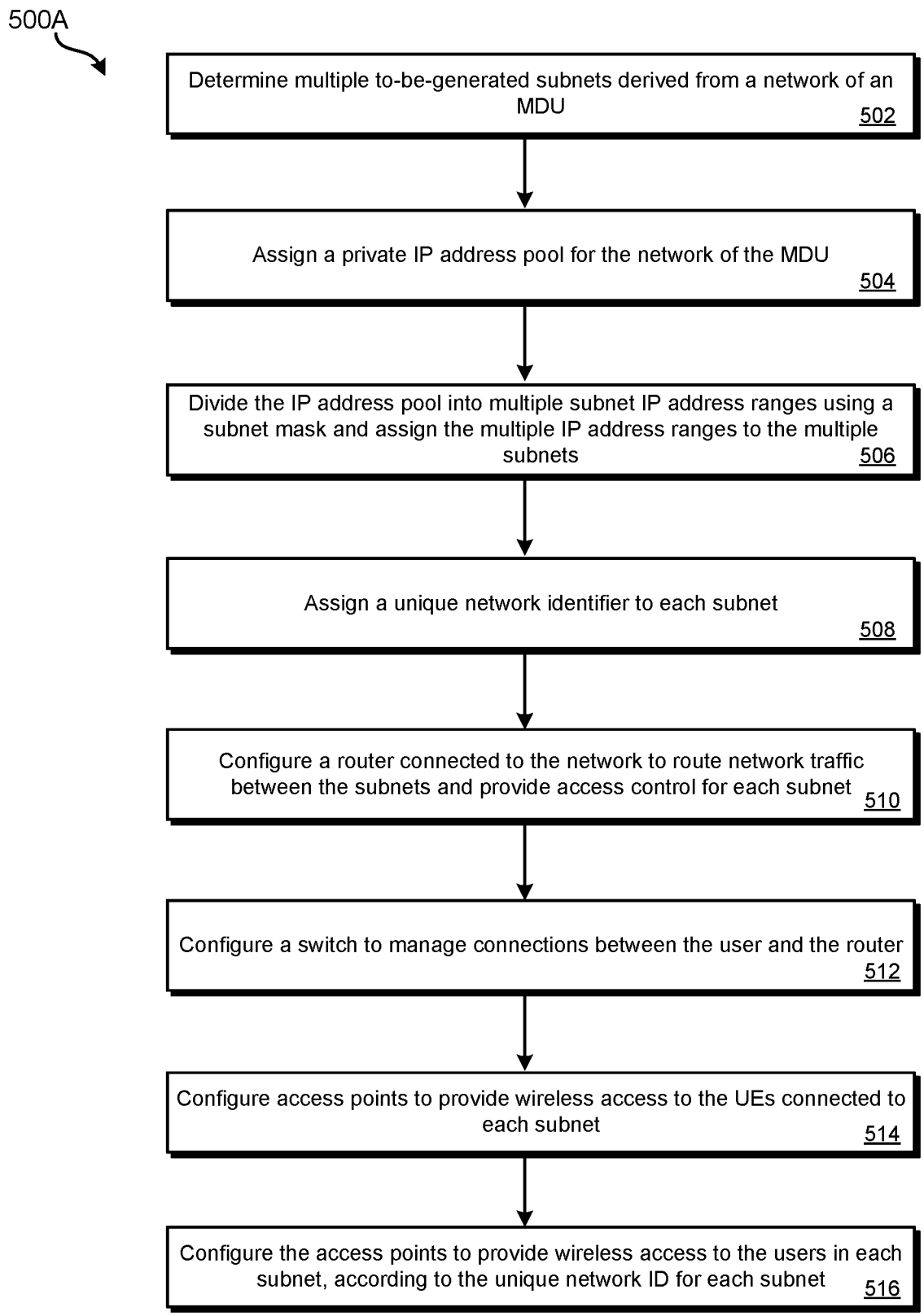
FIGS. 5A-5B are flow diagrams illustrating example methods for network segmentation according to various embodiments.

FIG. 5A is a flow diagram illustrating an example method 500A of network segmentation for an MDU. The method 500A may be performed by one or more components of the system or device illustrated by FIGS. 2 and 4, such as the network segmentation device 204, the backend server 401, the router 402, the router controller 407, etc. Depending on the implementation, the method 500A may include additional, fewer, or alternative steps performed in various orders or in parallel.

At 502, multiple to-be-generated subnets (or LANs) of a network (i.e., a wireless network or Internet) for an MDU are determined. The determination of to-be-generated subnets may be generally based on the number and feature of each zone (e.g., the zones 210 shown in FIG. 2) as well as other factors, including but not limited to the size of the zone, the number of users for each zone, the number of user devices for each zone, user experience levels, the network bandwidth requirements for each zone, expected network traffic for each zone, the types of services being provisioned for each zone, and the physical characteristics of the MDU property (i.e., building or premises layout). The users may include existing users (e.g., staff or management personnels in the MDU such as a hotel) and future users (e.g., guests in a MDU hotel). The user devices (or UEs) may include fixed devices such as televisions permanently installed in one of the zones of the MDU as well as mobile user devices such as smartphones carried by the users.

At 504, a private IP address pool (also referred to as IP pool) is assigned for the network of the MDU. The IP pool include multiple IP addresses in a range that are reserved for the users of the MDU and not publicly routable on the internet. The network devices such as the router, switch, and multiple access points are configured with the appropriate IP address information to enable communication. Network security devices such as firewalls are also configured with the appropriate IP address information to protect the network from unauthorized access.

At 506, the IP pool is divided into multiple subnet IP address ranges. In some embodiments, the IP pool is divided using a subnet mask, and the multiple IP address ranges are assigned respectively to the multiple subnets. In some embodiments, the subnet mask used herein is a 32-bit number that is used to distinguish the network part of an IP address from the host part. The mask is used in conjunction with the IP address to define the range of addresses in a subnet. When a network device or a user device needs to transmit data packets to a destination device on the same network segment, the destination IP address and the subnet mask are checked to determine whether the destination device is on the same network segment or a different network segment. If the destination device is on the same network segment, the transmitting device transmit the data packet directly to the destination device using the destination IP address. If the destination device is on a different network segment, the sending device sends the data to the router, which will determine the network traffic for the data packet according to the pre-established network policy.

At 508, a unique network identifier (also referred to as network ID) is assigned to each subnet. The network identifier maybe a Basic Service Set Identifier (BSSID), a Service Set Identifier (SSID), a Media Access Control (MAC) address, or a combination thereof. The SSID is typically a name for the subnet selected by the MDU administrator. The BSSID may be assigned to a wireless access point associated with a particular subnet to distinguish it from other access points associated with other subnets. The MAC may be assigned to a network interface controller (NIC) of the access point associated with a particular subnet for use as a network address in communications within a subnet. The BSSID, SSID, and MAC addresses can be assigned to the multiple subnets by configuring the router connected to the Internet.

At 510, the router connected to the Internet is configured to route network traffics between the subnets and provide access control for each subnet. In some embodiments, the LAN interfaces are configured to be on the same IP address range as the subnet it is serving. For example, each LAN interface may be assigned to a different subnet, and a unique IP address may be assigned to each interface within that subnet. The WAN interface of the router may be configured with the public IP address provided by the Internet Service Provider (ISP). The IP routing on the router is enabled to allow the router to forward network traffic between the subnets. The access control lists (ACLS) on the router may be configured to control which network traffic is allowed to pass between subnets. This will ensure that only authorized network traffic is allowed to cross from one subnet to another. The access control lists (ACLS) on the router may be configured to control which network traffic is allowed to pass from the router to the access point associated with a particular subnet. The Network Address Translation (NAT) on the router is also configured to allow UEs on the subnets to access the Internet using the public IP address of the WAN interface.

At 512, a switch connected to the router is configured to manage connections between the UEs and the router. In some embodiments, different switch ports on the switch are used to respectively connect with the subnets (e.g., one switch port corresponds to and is connected to the access point of a particular subnet). The ACLs on the router can be configured to restrict network traffic between the subnets as needed.

At 514, access points are configured to provide access (i.e., wireless access) to the UEs on each subnet. In some embodiments, the access point for each subnet is configured with the unique network ID (e.g., BSSID, SSID, MAC address, etc.) assigned to the subnet to broadcast the assigned network ID. The access point is further configured to assign IP addresses to the UEs of the subnet, for example, using Dynamic Host Configuration Protocol (DHCP). Additional settings for each access point such as power management or channel selection may also be configured.

At 516, the access points are configured to provide wireless access to streaming services and content resources for the users on each subnet, according to the unique network ID for each subnet. In some embodiments, a user request from a UE for a streaming service or content resource is received on the router. In response, the router routes network traffic carrying the data packets of the requested content to the access point of the subnet to which the UE is connected to. The UE receives the requested content via the access point of the subnet.

Figure 5B:
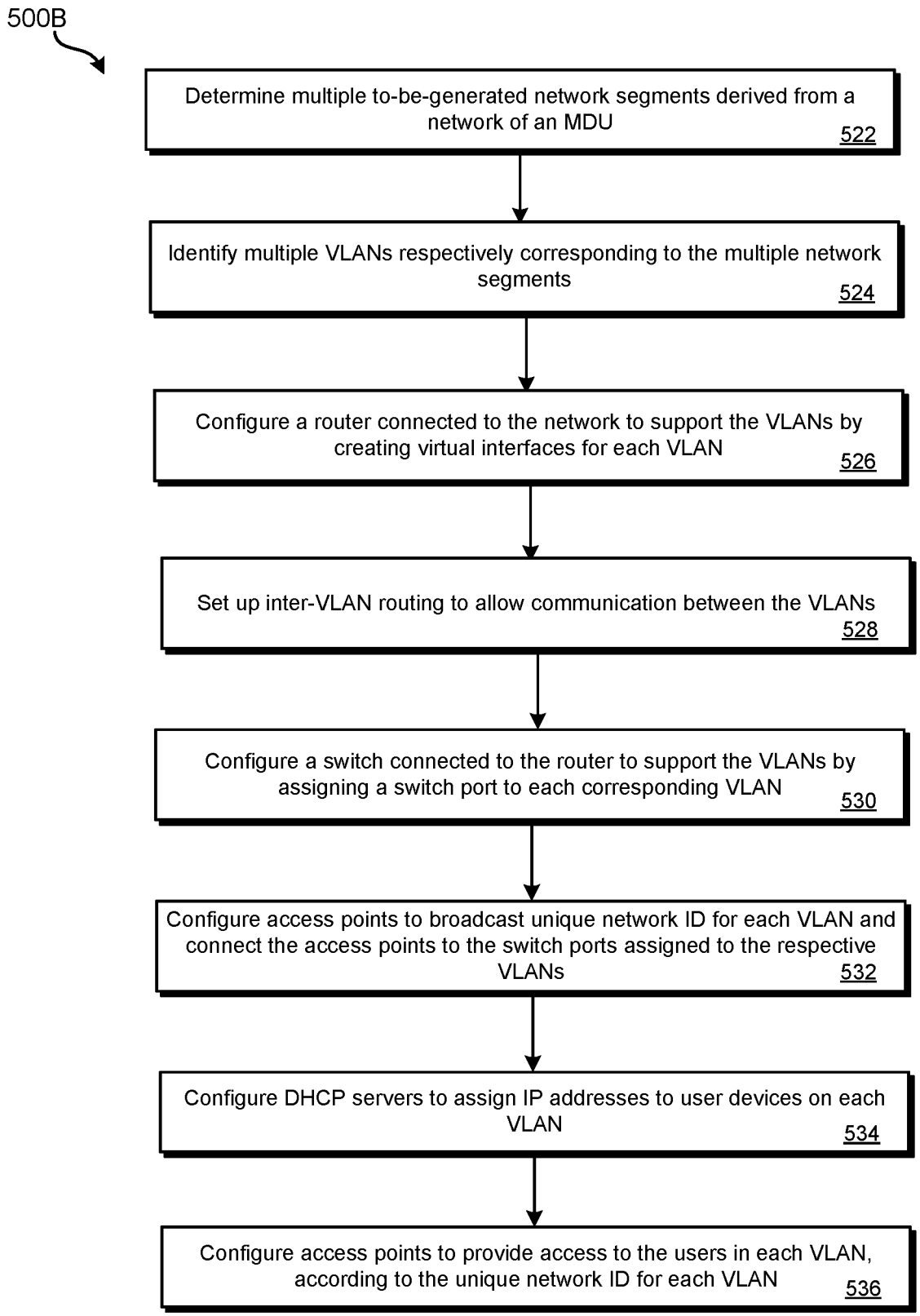

FIG. 5B is a flow diagram illustrating another example method 500B of network segmentation for an MDU. The method 500B is similar to the method 500A and may be performed by one or more components of the system or device illustrated by FIGS. 2 and 4, such as the network segmentation device 204, the backend server 401, the router 402, the router controller 407, etc. Depending on the implementation, the method 500B may include additional, fewer, or alternative steps performed in various orders or in parallel.

At 522, multiple to-be-generated network segments of a network (i.e., a wireless network or Internet) for an MDU are determined. At 524, multiple VLANs are identified respectively corresponding to the multiple network segments. At 526, a router connected to the network is configured to support the VLANs by creating virtual interfaces for each VLAN. A unique network ID is assigned to each VLAN. At 528, IP addresses are assigned to each virtual interface to enable routing between the virtual interfaces and allow communication between the VLANs. At 530, a switch connected to the router is configured to support the VLANs assigning a switch port to each corresponding VLAN. At 532, the access point associated with the corresponding VLAN is configured to broadcast the unique network ID for each VLAN and connect the access points to the switch ports assigned to the respective VLANs. At 534, IP addresses are assigned to UEs on each VLAN using DHCP. At 536, access points are configured to provide wireless access to the UEs in each VLAN, according to the unique network ID for each VLAN.

Figure 6A:
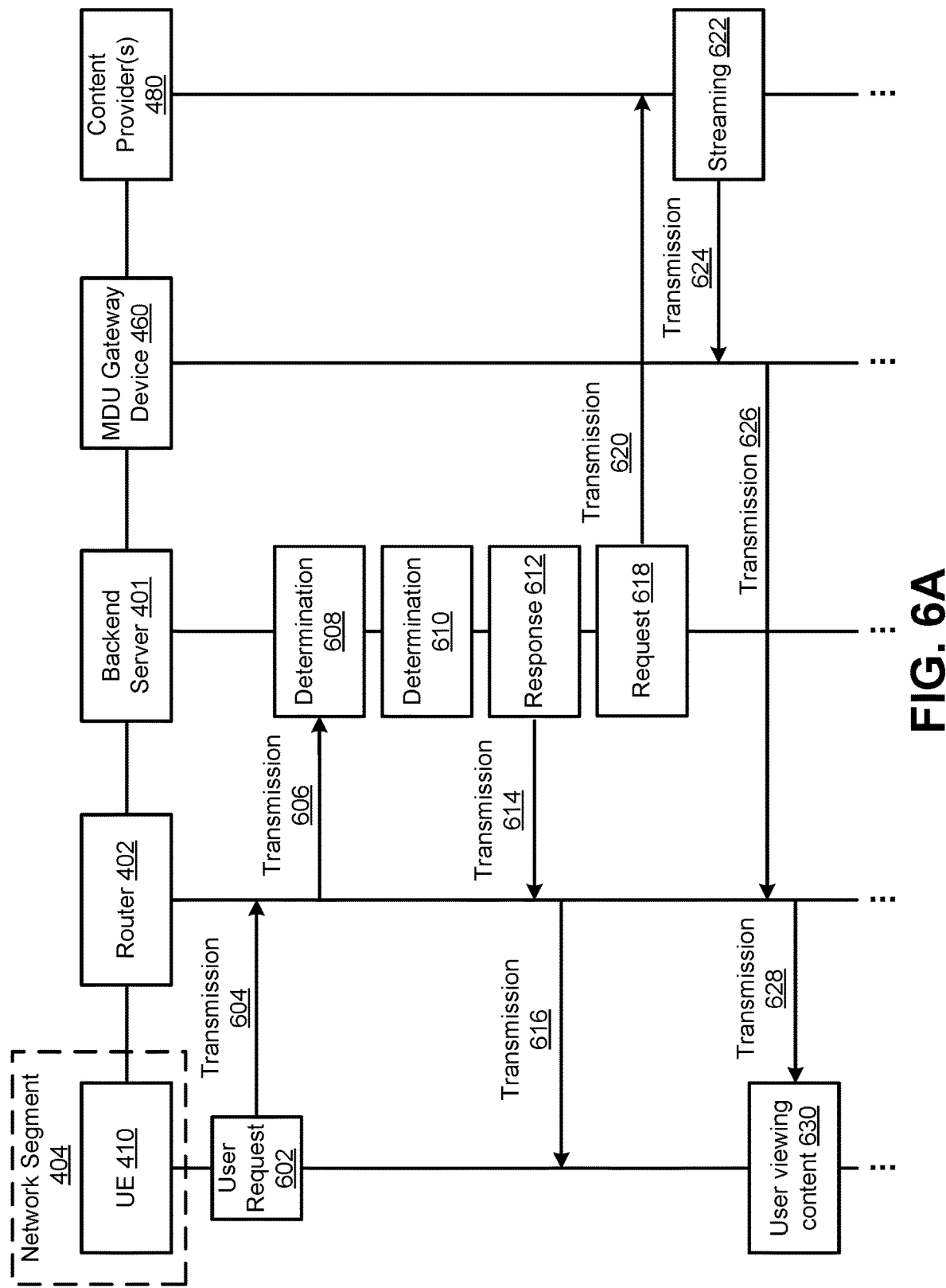
FIGS. 6A-6B are example system messaging diagrams of the interactions between components of a communications system, in accordance with various embodiments.

FIG. 6A illustrates an example system messaging diagram of the interactions between components of the system 400 described herein, in accordance with various embodiments. Each component includes software, hardware, or a combination of both. In one example, a UE 410 connected to a network segment 404 of a network for an MDU, used by a user of the MDU, can generate a user request (FUNCTION 602) for a content item to be streamed on the UE (e.g., user hitting a URL for live streaming provided in a user interface of the UE). The user request may include user information and a unique network identifier of the network segment to which the UE 410 is connected. The user information may include the user identity, UE identity, user account information, or other information in a user profile previously registered on the backend server 401. The unique network identifier may include the network segmentation information such as the network identity (e.g., BSSID, SSID, MAC address) of the network segment 404 or the IP address assigned to the UE 410. The user request is transmitted (TRANSMISSION 604) to the router 402. The router 402 may forward (TRANSMISSION 606) the user request to the backend server 401.

Upon receipt of the user request, the backend server 401 makes a first determination (FUNCTION 608) on whether the content item is included in the streaming services and content resources designated to the network segment 404 to which the UE 410 is connected, based on the pre-established network policy. In some embodiments, the backend server 401 makes a second determination on the authentication status of the user and/or the eligibility of the UE to access the content. The user information included in the user request is used to authenticate the user to access the requested content using the UE 410. The backend server 401 generates a response (FUNCTION 610) based on the result of the determination(s). If the content item is determined to be available in the streaming services and content resources designated to the network segment 404 and the user is authenticated, the response includes an indication that the content item is available and accessible. On the other hand, if the content item is determined not available in the streaming service and content resource designated to the network segment 404 or the access to the requested content item is restricted due to network policy, the response includes an indication that the content item is not available. The response is then transmitted (TRANSMISSION 614) to the router 402. The response may be further transmitted (TRANSMISSION 616) to the UE to notify the user about the content availability and/or user authentication status.

In response to the determination that the content item is available in the streaming services and resources designated to the network segment 404 and the user is authenticated, the backend server 401 may generate a content request (FUNCTION 618) for the content to be streamed on the UE 410 and transmits (TRANSMISSION 620) the content request to the content provider 480. Upon receipt of the content request, the content provider initiates streaming (FUNCTION 622) of the requested content item and transmits (TRANSMISSION 624) data packets of the requested content item to the MDU gateway device 460. The MDU gateway device 460 further processes the received data packets and transmit (TRANSMISSION 626) the requested content item to the router 402. The router 402 routes the network traffic carrying the requested content item (TRANSMISSION 628) to the network segment 404 to which the UE 410 is connected. The requested content item is streamed (FUNCTION 630) on a user interface of the UE 410 to allow the user to view the content.

Figure 6B:
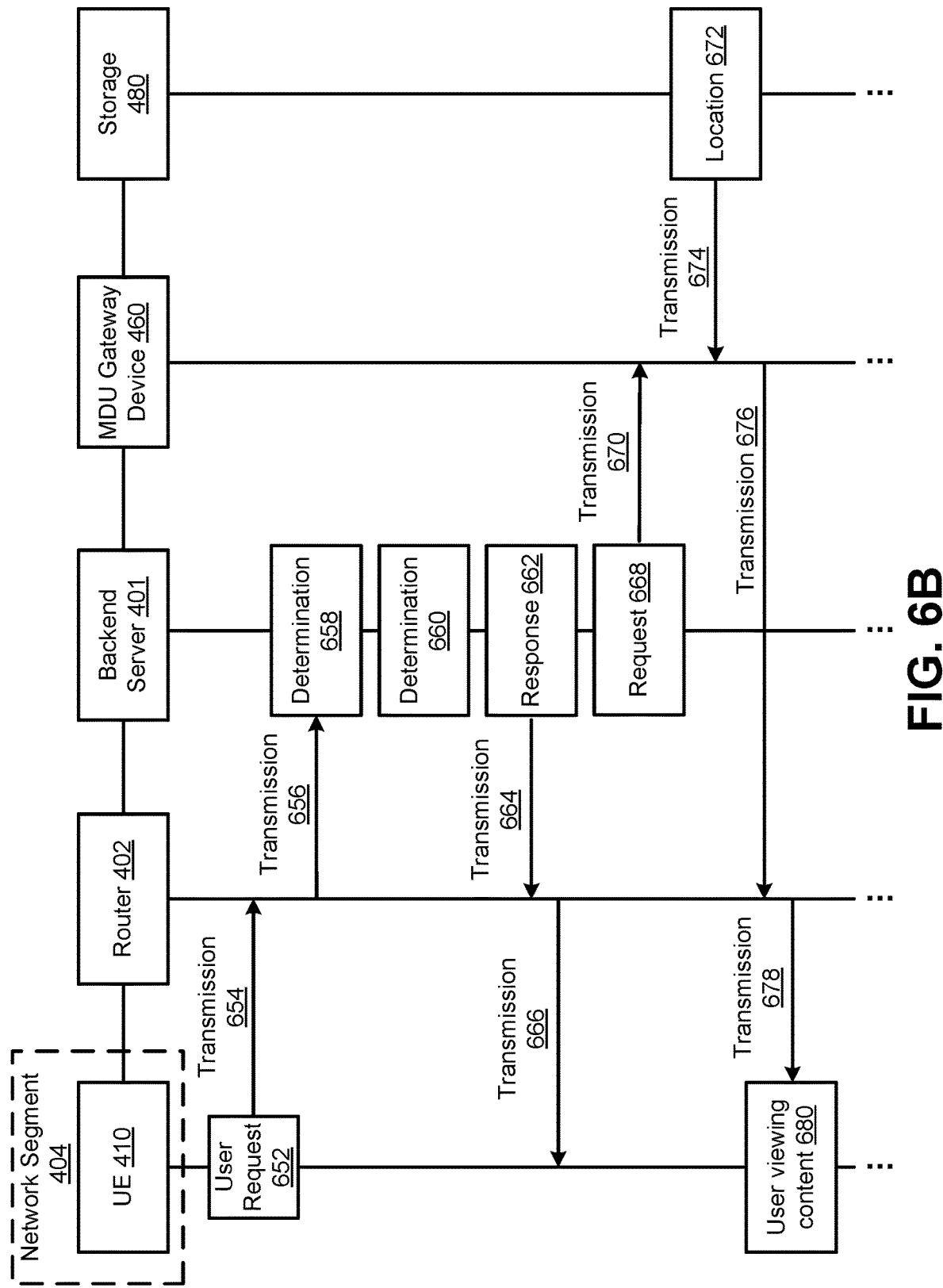

FIG. 6B illustrates another example system messaging diagram of the interactions between components of the system 400 described herein, in accordance with various embodiments. Each component includes software, hardware, or a combination of both. In one example, a UE 410 connected to a network segment 404 of a network for an MDU, used by a user of the MDU, can generate a user request (FUNCTION 652) for a shared recording to be played on the UE. The shared recording may be generated previously by the recording device 450 and stored in the storage device 455 of FIG. 4. The user request may include user information of the user and a unique network identifier of the network segment to which the UE 410 is connected. The user information may include the user identity, UE identity, user account information, or other information in a user profile previously registered on the backend server 401. The unique network identifier may include the network segmentation information such as the network identity (e.g., BSSID, SSID, MAC address) of the network segment 404 or IP address assigned to the UE 410. The user request is transmitted (TRANSMISSION 654) to the router 402. The router 402 may forward (TRANSMISSION 656) the user request to the backend server 401.

Upon receipt of the user request, the backend server 401 makes a first determination (FUNCTION 658) on whether the shared recording is included in the streaming services and content resources designated to the network segment 404 to which the UE 410 is connected, based on the pre-established network policy. In some embodiments, the backend server 401 makes a second determination (FUNCTION 660) on the authentication status of the user and/or the eligibility of the UE regarding the accessibility of the requested shared recording. The user information included in the user request is used to authenticate the user to access the requested shared recording using the UE 410. The backend server 401 generates a response (FUNCTION 662) based on the result of the determination(s). If the shared recording is determined to be available in the streaming services and content resources designated to the network segment 404 and the user is authenticated, the response includes an indication that the shared recording is available and accessible. On the other hand, if the shared recording is determined not available in the streaming services and content resources designated to the network segment 404 or the access to the requested shared recording is restricted due to network policy, the response includes an indication that the shared recording is not available. The response is then transmitted (TRANSMISSION 664) to the router 402. The response may be further transmitted (TRANSMISSION 666) to the UE to notify the user about the availability of the shared recording and/or the user authentication status.

In response to the determination that the shared recording is available in the streaming services and resources designated to the network segment 404 and the user is authenticated, the backend server 401 may generate a content request (FUNCTION 668) for the content of the requested shared recording to be streamed on the UE 410 and transmits (TRANSMISSION 670) the content request to the MDU gateway device 460. Upon receipt of the content request, the MDU gateway device 460 locates the shared recording (FUNCTION 672) in the storage 455 and receive the data packets of the content of the shared recording (TRANSMISSION 674). The MDU gateway device 460 further processes the received data packets and transmit (TRANSMISSION 676) the requested shared recording to the router 402. The router 402 routes the network traffic carrying the requested shared recording (TRANSMISSION 678) to the network segment 404 to which the UE 410 is connected. The requested shared recording is streamed (FUNCTION 680) on a user interface of the UE 410 to allow the user to view the content of the shared recording.

Figure 7A:
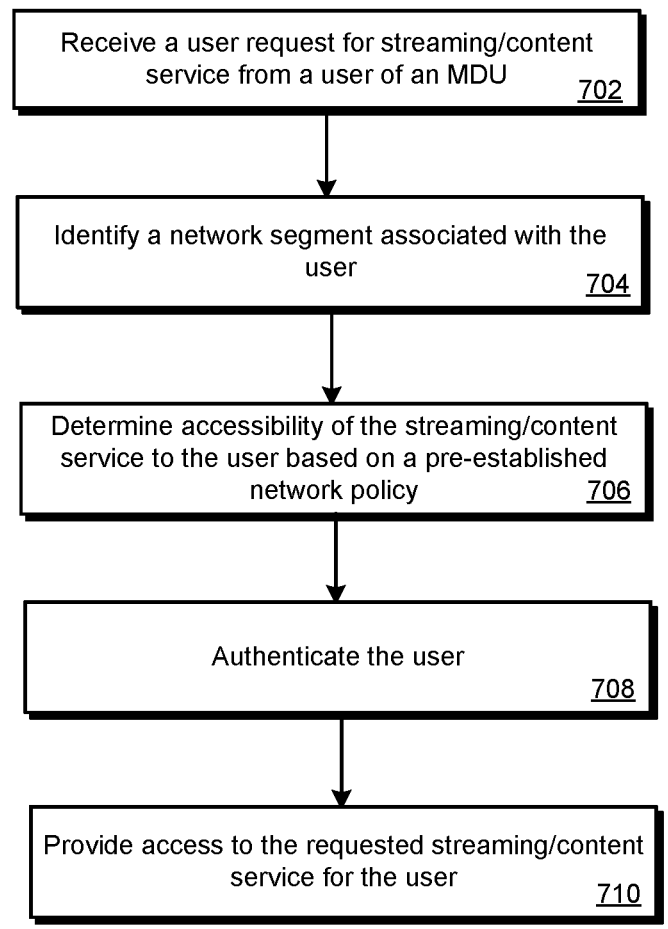
FIG. 7A-7B are flow diagrams illustrating example methods for provisioning content streaming service according to various embodiments.

FIG. 7A is a flow diagram illustrating an example method 700A for streaming service provisioning, according to various embodiments. The method 700A may be performed by one or more components of the system or device illustrated by FIGS. 1-2 and 4, such as one or more components of the system 100, 200, and 400. Depending on the implementation, the method 700A may include additional, fewer, or alternative steps performed in various orders or in parallel.

At 702, a user request for content streaming service is received, on a backend server. The user request is generated by a UE connected to a network segment of a network of an MDU. The user request may include user information and a unique network identifier of the network segment to which the UE is connected. The user information may include the user identity, UE identity, user account information, or other information in a user profile previously registered on the backend server. The unique network identifier may include the network segmentation information such as the network identity (e.g., BSSID, SSID, MAC address) of the network segment to which the UE is connected and/or the IP address assigned to the UE.

At 704, the network segment is identified, by the backend server, based on the unique network identity provided in the user request. For example, the network segment can be identified based on the BSSID, SSID, or the MAC address assigned to the network segment. The network may be a wireless network, and the network segment of the network may be a subnet of the network or a VLAN.

At 706, a determination is made on the accessibility of the content streaming service to the user, based on a pre-established network policy. As mentioned above, the pre-established network policy for streaming and content services for each network segment in the MDU would typically include rules and regulations regarding which types of content can be accessed by users connected to each network segment. The network policy would define the specific streaming services or content resources that are allowed or blocked on each network segment based on factors such as user level, network usage, and security requirements.

At 708, an authentication process is performed, by the backend server, to determine that the user of UE is authorized to access the requested content and/or that the UE is eligible to receive and stream the requested content. In some embodiments, the user information included in the user request is analyzed to facilitate the authentication process.

At 710, in response to the determination that the user is authorized and/or that the UE is eligible, access to the requested content is provided for the user.

Figure 7B:
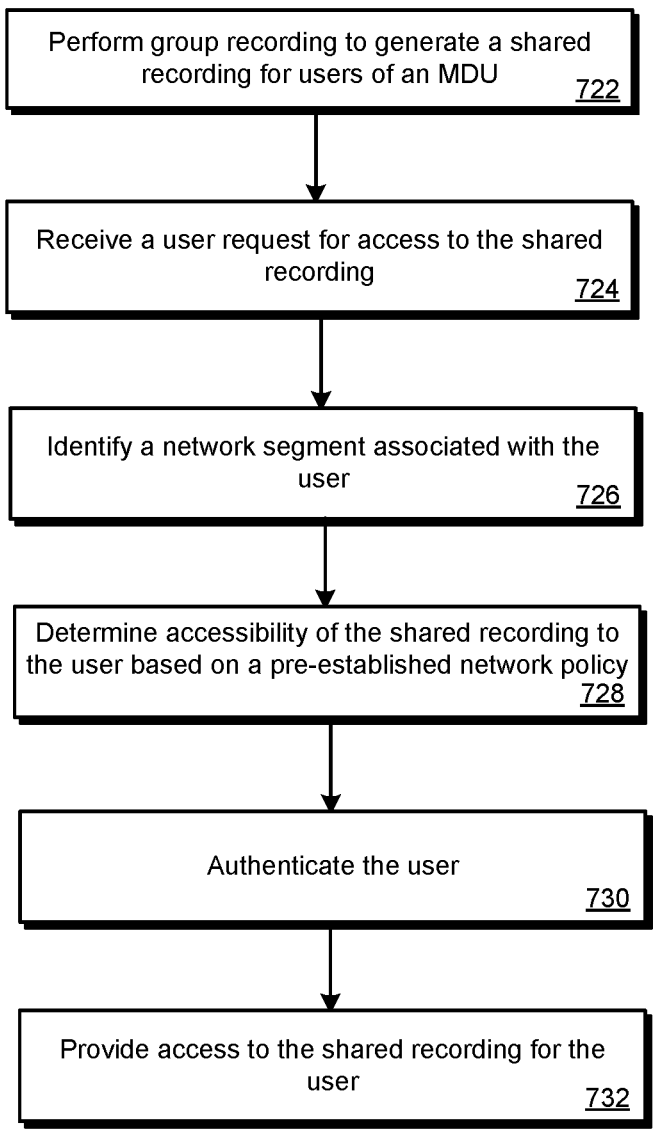

FIG. 7B is a flow diagram illustrating an example method 700B for streaming service provisioning, according to various embodiments. The method 700A is similar to the method 700B and may be performed by one or more components of the system or device illustrated by FIGS. 1-2 and 4, such as one or more components of the system 100, 200, and 400. Depending on the implementation, the method 700B may include additional, fewer, or alternative steps performed in various orders or in parallel.

At 722, group recording is performed to generate, by the recording device, a shared recording for users of an MDU. The group recording may be stored in the storage accessible by the MDU gateway device.

At 724, a user request for the content of the shared recording is received, on a backend server. The user request is generated by a UE connected to a network segment of a network of an MDU. The user request may include user information and a unique network identifier of the network segment to which the UE is connected. The user information may include the user identity, UE identity, user account information, or other information in a user profile previously registered on the backend server. The unique network identifier may include the network segmentation information such as the network identity (e.g., BSSID, SSID, MAC address) of the network segment to which the UE is connected and/or the IP address assigned to the UE.

At 726, the network segment is identified, by the backend server, based on the unique network identity provided in the user request. For example, the network segment can be identified based on the BSSID, SSID, or the MAC address assigned to the network segment. The network may be a wireless network, and the network segment of the network may be a subnet of the network or a VLAN.

At 728, a determination is made on the accessibility of the shared recording to the user, based on a pre-established network policy. As mentioned above, the network policy may define the specific shared recording that are allowed or blocked on each network segment based on factors such as user level, network usage, and security requirements.

At 730, an authentication process is performed, by the backend server, to determine that the user of UE is authorized to access the requested shared recording and/or that the UE is eligible to receive and stream the requested shared recording. In some embodiments, the user information included in the user request is analyzed to facilitate the authentication process.

At 732, in response to the determination that the user is authorized and/or that the UE is eligible, access to the requested shared recording is provided for the user.

Figure 8:
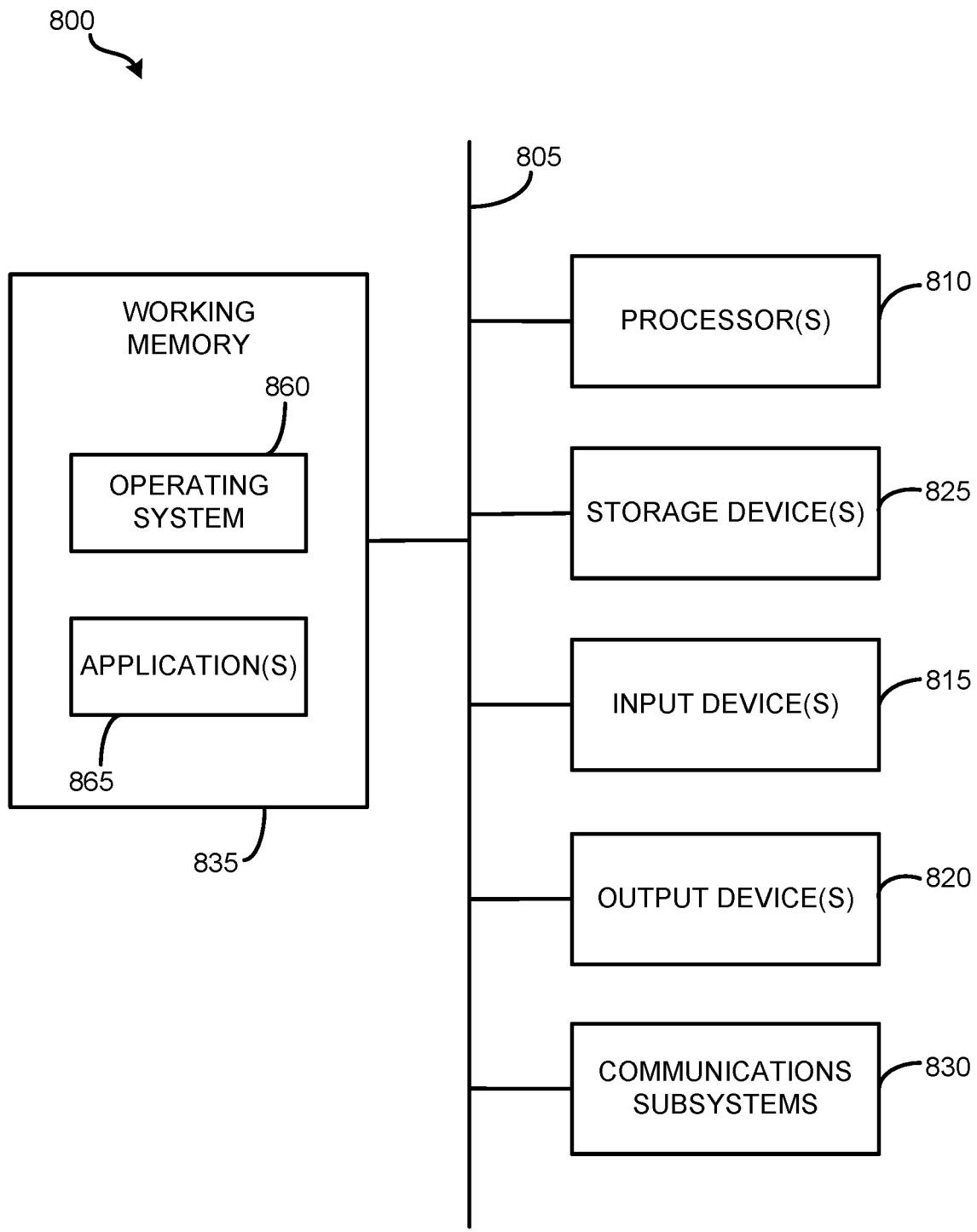
FIG. 8 is a schematic diagram illustrating an embodiment of a computer system according to various embodiments.

FIG. 8 is a schematic diagram illustrating an example of computer system 800. The computer system 800 is a simplified computer system that can be used to implement various embodiments described and illustrated herein. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 602.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g., the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 860, device drivers, executable libraries, and/or other code, such as one or more application programs 865, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 860 and/or other code, such as an application program 865, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

It should be understood that the content delivery and recording systems according to the present disclosure may include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present disclosure.

Further, while the following disclosure is made with respect to the recording of content (e.g., television (TV), movies, music videos, etc.), it should be understood that the systems and methods disclosed herein could also be used for of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method, comprising:
   dividing a network associated with a multi-dwelling unit (MDU) having a plurality of zones within the MDU into a plurality of network segments respectively corresponding to the plurality of zones;
   dividing a content resource provided by the MDU into a plurality of content segments respectively corresponding to the plurality of network segments, each content segment of the content resource comprising content items specific to the corresponding network segment based on a predetermined network policy;
   receiving a user request sent from a user equipment (UE) for access to a content item of the content resource;
   determining that the UE is associated with one of the network segments and that the requested content item is included in the content segment of content resource specific to the network segment, based on the network policy; and
   granting the access to the content item to the UE;
   wherein the content item is a shared recording stored in the content segment of content resource.

2. The method of claim 1, further comprising:
   dividing an IP address pool assigned to the network into a plurality of IP address ranges using a subnet mask;
   assigning the plurality of IP address ranges respectively to the plurality of network segments, wherein the network segments are subnets; and
   assigning a unique network identifier to each one of the subnets.

3. The method of claim 2, further comprising:
   configuring a router connected to the network to route network traffic between the subnets and provide access control for each subnet.

4. The method of claim 2, wherein the unique network identifier for each network segment comprises at least one of: a Basic Service Set Identifier (BSSID), a Service Set Identifier (SSID), and a Media Access Control (MAC) address.

5. The method of claim 3, further comprising:
   configuring a switch connected to the router to manage connections between the user and the router.

6. The method of claim 3, further comprising:
   configuring an access point (AP) connected to the router to provide access to the UE connected to the subnet, according to the unique network identity assigned to the subnet.

7. The method of claim 1, further comprising:
   configuring a router connected to the network to create a plurality of virtual interfaces for each network segment, wherein each network segment is a virtual local area network (VLAN);
   assigning a plurality of IP address ranges respectively to the plurality of virtual interfaces; and
   assigning a unique network identifier to each one of the VLANs.

8. The method of claim 7, further comprising:
   configuring one or more access point (AP) connected to each one of the VLANs to broadcast the unique network ID assigned to the VLAN; and
   providing access of the content item to the UE connected to the VLAN, according to the unique network ID for the VLAN.

9. The method of claim 1, wherein the content item is a channel list of TV programs.

10. A system comprising:
    one or more processors; and
    a computer-readable storage media storing computer-executable instructions that, when executed by the one or more processors, cause the system to:
    divide a network associated with a multi-dwelling unit (MDU) having a plurality of zones within the MDU into a plurality of network segments respectively corresponding to the plurality of zones;
    divide a content resource provided by the MDU into a plurality of content segments respectively corresponding to the plurality of network segments, each content segment of the content resource comprising content items specific to the corresponding network segment based on a predetermined network policy;
    receive a user request sent from a user equipment (UE) for access to a content item of the content resource;

determine that the UE is associated with one of the network segments and that the requested content item is included in the content segment of content resource specific to the network segment, based on the network policy; and grant the access to the content item to the UE;

wherein the content item is a shared recording stored in the content segment of content resource.

11. The system of claim 10, wherein the instructions are further executable to cause one or more electronic processors of the system to:

divide an IP address pool assigned to the network into a plurality of IP address ranges using a subnet mask;

assign the plurality of IP address ranges respectively to the plurality of network segments, wherein the network segments are subnets; and assign a unique network identifier to each one of the subnets.

12. The system of claim 11, wherein the instructions are further executable to cause one or more electronic processors of the system to:

configure a router connected to the network to route network traffic between the subnets and provide access control for each subnet.

13. The system of claim 11, wherein the unique network identifier for each network segment comprises at least one of: a Basic Service Set Identifier (BSSID), a Service Set Identifier (SSID), and a Media Access Control (MAC) address.

14. The system of claim 12, wherein the instructions are further executable to cause one or more electronic processors of the system to:

configure a switch connected to the router to manage connections between the user and the router.

15. The system of claim 12, wherein the instructions are further executable to cause one or more electronic processors of the system to:

configure an access point (AP) connected to the router to provide access to the UE connected to the subnet, according to the unique network identifier assigned to the subnet.

16. The system of claim 10, wherein the instructions are further executable to cause one or more electronic processors of the system to:

configure a router connected to the network to create a plurality of virtual interfaces for each network segment, wherein each network segment is a virtual local area network (VLAN);

assign a plurality of IP address ranges respectively to the plurality of virtual interfaces; and assign a unique network identifier to each one of the VLANs.

17. The system of claim 16, wherein the instructions are further executable to cause one or more electronic processors of the system to:

configure one or more access point (AP) connected to each one of the VLANs to broadcast the unique network ID assigned to the VLAN; and provide access of the content item to the UE connected to the VLAN, according to the unique network ID for the VLAN.

18. The system of claim 10, wherein the content item is a channel list of TV programs.

* * * * *